May 9, 1961 D. H. POLZIN 2,983,122
SLIP CLUTCH
Filed Oct. 15, 1958
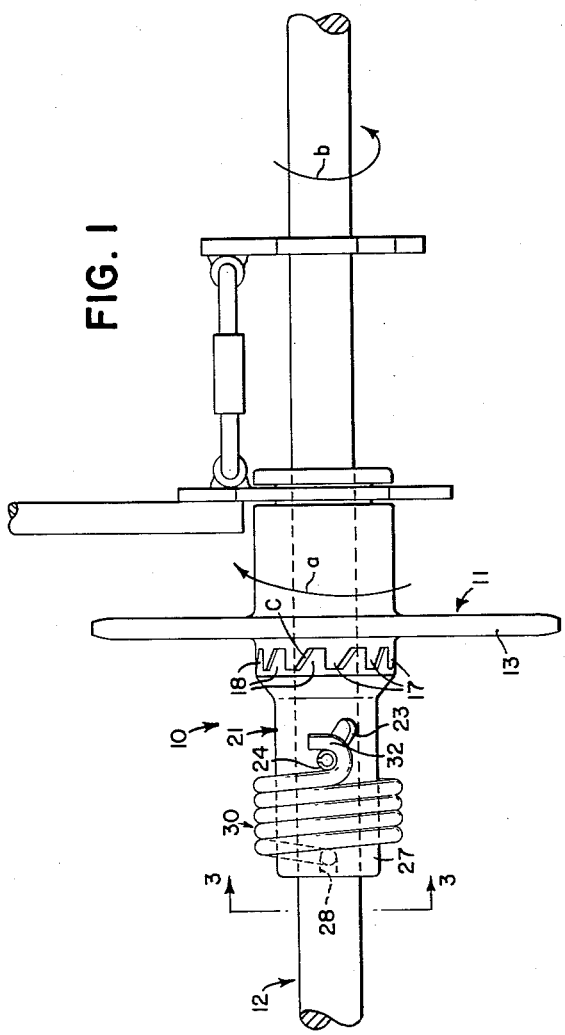
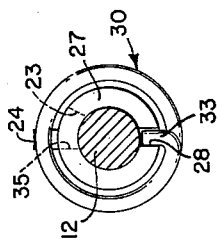
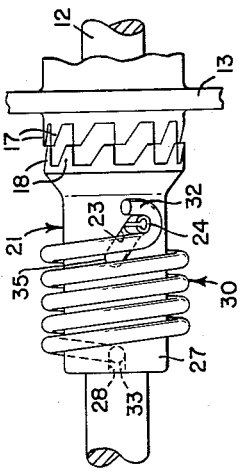
INVENTOR.
DONALD H. POLZIN
BY
C. T. Parker R. C. Johnson
ATTORNEYS United States Patent Office 2,983,122
Patented May 9, 1961

2,983,122
SLIP CLUTCH
Donald H. Polzin, Horicon, Wis., assignor to Deere & Company, Moline, Ill., a corporation of Delaware
Filed Oct. 15, 1958, Ser. No. 767,344
5 Claims. (Cl. 64—29)

The present invention relates generally to agricultural machines and more particularly to slip clutches and similar devices that frequently are incorporated in agricultural machines to prevent damage to parts that need protection from overloads.

The object and general nature of this invention is the provision of a slip clutch in which means is provided for imparting a rotational or torsional impact to the driven member when the slip clutch yields. These impact forces serve to dislodge the cause of the overload, if it is possible to do so. More specifically, it is a feature of this invention to provide a slip clutch mechanism which incorporates a part that rotates relative to the driven member when the slip clutch yields, with associated biased means acting to return the relatively rotatable part to its original normal position with a positive accelerated action so that, as a consequence thereof, a torsional impact is imposed on the driven part.

These and other advantages of the present invention will be apparent to those skilled in the art after a consideration of the following detailed description, taken in conjunction with the accompanying drawings, in which:

Fig. 1 is a fragmentary elevation showing slip clutch means incorporated between driving and driven parts, the slip clutch parts being shown in normal engaged or driving position.

Fig. 2 is a fragmentary view showing the clutch parts at the momentary instant of disconnection.

Fig. 3 is a section taken along the line 3—3 of Fig. 1.

In order to illustrate the principles of this invention I have shown the same as incorporated in a slip clutch 10 adapted to connect a driving part 11 with a driven shaft 12. The driving part may take any suitable form and is shown as a gear 13 rotatably mounted on the shaft 12 and having a plurality of angled clutch teeth 17 that cooperate with similar clutch teeth 18 formed on a sleeve 21 that is rotatable, within limits, on the driven shaft 12. The sleeve 21 constitutes a second driven member. Normally, the gear rotates in the direction of the arrow $a$.

The sleeve 21 is provided with an angled slot 23 receiving a stud in the form of a roll pin 24 that is fixed to the driven shaft 12. The sleeve 21 includes an elongated or hub section 27 and in the end thereof that is opposite the stud 24, there is an axially facing slot or recess 28. A torsion spring 30 is disposed about the hub section 27 of the sleeve 21 and has one end shaped to form a hook 32 that engages over the pin or stud 24. The other end of the spring 30 is formed with a similar hook section 33 that engages in the associated slot or recess 28, as shown in Fig. 3.

As will be seen from Fig. 1, the sleeve 21 may rotate relative to the driven shaft 12 within the limits of the slot 23 and when the member 21 rotates relative to the member 12, it is also shifted axially therealong by virtue of the diagonal position of the slot 23. The parts are so arranged that in normal operation the clutch teeth 17 and 18 are in engagement and the drive from the driving gear 13 is transmitted to the shaft 12 through the sleeve 21 and pin 24. The spring 30 is prestressed so that normally loads are transmitted from the gear 13 to the shaft 12 without appreciable yielding of the spring 30. However, upon the occurrence of an overload the following actions take place:

First, the spring 30 yields and permits the sleeve 21 to rotate relative to the shaft 12 but in so rotating the sleeve 21 is shifted axially toward the left as viewed in Fig. 1 due to the action of the slot 23 and stud 24. This not only stresses the spring torsionally, but also serves to stretch the spring 30 in an axial direction. As this axial movement takes place the teeth 17 and 18 move toward a position of disengagement, as shown in Fig. 2, which occurs when the overload is sufficient to overcome the force exerted by the spring. Second, after the teeth 17 and 18 become disengaged to the extent that the ends of the teeth 17 slip by the ends of the teeth 18 for a distance of one tooth, after which the teeth are free to re-engage, the spring 30, now stressed not only under torsion but also axially, immediately rotates the sleeve 21 in the other direction relative to the shaft 12 and also drives the sleeve toward the gear 13 until the end 35 of the slot comes up against the stud 24. In order to accommodate this rapid movement of the sleeve 21 back into engagement with the stud 24, the teeth 17 and 18 are formed to have a slight clearance C when engaged (Fig. 1) so that notwithstanding the continued forward rotation of the driving part 11, the left end (Figs. 1 and 2) of the slot 23 will be driven by the spring 30 back against the stud before the flat faces of the teeth 18 contact the flat faces of the forwardly advancing teeth 17 on the driving part. The rate of movement of the latter is very slow relative to the rate of response of the spring 30 and sleeve 21 when the teeth 18 are momentarily disengaged from the teeth 17 (Fig. 2) upon occurrence of an overload.

This suddenly applied force is imposed on the shaft 12 through the stud 24 as an impact force due not only to the force exerted by the stressed spring 30 but also to any inertia or momentum built up in the sleeve 21. This impact force thus acts to rotate the shaft 12 in the direction indicated by the arrow $b$, which is opposite to the direction in which it is normally driven. Thus, whenever the slip clutch yields, the driven shaft is subjected to torsional impact forces that tend to rotate the driven shaft in a backward direction, thus acting in most cases to relieve the overload and release the parts that became jammed or locked.

As soon as the overload is removed or relieved, the slip clutch parts automatically take the normal driving position indicated in Fig. 1, the spring 30 acting to hold the sleeve 31 in a position with the end of the slot 35 up against the stop stud 24.

Having described my invention, what I claim and desire to secure by Letters Patent is:

1. A slip clutch comprising a pair of relatively movable driven parts, a spring connecting said parts and opposing relative movement therebetween in one direction, stop means carried by one of said parts and cooperating with the other of said parts for limiting said relative movement in the other direction, and driving means releasably connected with said one driven part for driving the other through said spring.

2. A slip clutch comprising a driving member, two driven members one rotatable relative to the other, stop means carried by one of said driven members and engageable with the other for limiting said relative rotation in one direction, a torsion spring connected between said driven members and biased to hold said other member against said stop means, said torsion spring acting to yieldingly resist said relative rotation in the other direction, and means releasably connecting said driving member with said other driven, said tension spring acting when said releasable connecting means is released to deliver an impact blow against said one driven member.

3. A slip clutch comprising a driving member, two driven members one rotatable relative to the other, stop means carried by one of said driven members and engageable with the other for limiting said relative rotation in one direction, said stop means comprising a stud carried by said one member, an angled slot in the other member receiving said stud, a torsion spring connected at one end to said stud, and means connecting the other end of said torsion spring to said other member at a point spaced axially from said slot.

4. A slip clutch comprising a driven shaft adapted to be driven in one direction, a driven member comprising a sleeve rotatable on said shaft and having an angled slot, a stud fixed to said shaft and disposed in said angled slot, whereby when said sleeve is rotated on said shaft the sleeve is also shifted axially thereof, a biasing spring connected at one end to said sleeve and at the other end to said stud, contact of the latter with one end of said slot serving to limit rotation of said sleeve on said shaft in the other direction under the action of said spring, a driving member rotatable relative to said shaft, and angled clutch teeth on said driving and driven members, rotation of said driving member in one direction acting through said teeth, sleeve, spring, and stud to drive said driven shaft in said one direction, said spring yielding under overload conditions to permit said stud to move in said angled slot away from said one end of the slot until said teeth separate, said spring then acting to rotate said sleeve on said shaft and bring said end of the slot against said stud, thereby imparting an impact force to said shaft.

5. A slip clutch comprising a driving member, a driven member, a part rotatable on said driven member, stop means limiting movement of said part relative to said driven member, spring means connected between said part and said driven member, and means releasably connecting said driving member with said part and acting through the latter and said spring means to drive said driven member, said releasable connecting means being responsive to yielding of said spring means to release said driving member from said part.

References Cited in the file of this patent

UNITED STATES PATENTS

| | | |
|---|---|---|
| 1,167,285 | Flogland | Jan. 4, 1916 |
| 1,999,841 | MacGregor | Aug. 29, 1932 |
| 2,105,218 | Kirby | Jan. 11, 1938 |
| 2,233,539 | Landrum | Mar. 4, 1941 |
| 2,250,736 | Torresen | July 29, 1941 |
| 2,390,908 | Young | Dec. 11, 1945 |

FOREIGN PATENTS

| | | |
|---|---|---|
| 717,424 | Great Britain | Oct. 27, 1954 |